United States Patent
Cho et al.

(10) Patent No.: US 12,089,616 B2
(45) Date of Patent: Sep. 17, 2024

(54) METHOD FOR PRODUCING TEMPE-CONTAINING SAUCE AND SAUCE PRODUCED THEREFROM

(71) Applicant: CJ CHEILJEDANG CORPORATION, Seoul (KR)

(72) Inventors: Sun A Cho, Suwon-si (KR); Hee Jin Kim, Suwon-si (KR); Hye Won Shin, Suwon-si (KR); Ki Moon Kang, Suwon-si (KR); Kil Jae Lee, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 571 days.

(21) Appl. No.: 17/298,146

(22) PCT Filed: Oct. 30, 2020

(86) PCT No.: PCT/KR2020/015008
§ 371 (c)(1),
(2) Date: May 28, 2021

(87) PCT Pub. No.: WO2021/086100
PCT Pub. Date: May 6, 2021

(65) Prior Publication Data
US 2022/0022500 A1   Jan. 27, 2022

(30) Foreign Application Priority Data
Oct. 30, 2019 (KR) .................. 10-2019-0136662
Oct. 29, 2020 (KR) .................. 10-2020-0142341

(51) Int. Cl.
*A23L 11/50*  (2021.01)
*A23L 23/00*  (2016.01)
*A23L 27/40*  (2016.01)

(52) U.S. Cl.
CPC ............... *A23L 11/50* (2021.01); *A23L 23/00* (2016.08); *A23L 27/40* (2016.08); *A23V 2002/00* (2013.01)

(58) Field of Classification Search
CPC .......... A23L 11/50; A23L 27/40; A23L 23/00; A23V 2002/00
See application file for complete search history.

(56) References Cited

U.S. PATENT DOCUMENTS 4,265,915 A * 5/1981 MacLennan ........... A01G 18/20
435/933
2022/0022500 A1* 1/2022 Cho ..................... A23L 27/60

FOREIGN PATENT DOCUMENTS

| CN | 103053992 | * | 4/2013 |
| CN | 104543799 A | | 4/2015 |
| CN | 104939039 | * | 9/2015 |
| CN | 107348469 A | | 11/2017 |
| CN | 107455668 A | | 12/2017 |
| CN | 108740792 A | | 11/2018 |
| CN | 108936319 | * | 12/2018 |
| CN | 109938276 | * | 6/2019 |
| JP | 2007-175024 A | | 7/2007 |
| KR | 10-1988-0010687 A | | 10/1988 |
| KR | 10-1990-0008211 B1 | | 11/1990 |
| KR | 10-1300019 B1 | | 8/2013 |
| KR | 10-1518267 B1 | | 5/2015 |
| KR | 10-2017-0074439 A | | 6/2017 |

OTHER PUBLICATIONS

English Translation for CN108936319 published Dec. 2018.*
English Translation for CN103053992 published Apr. 2013.*
English Translation for KR20170074439 published Jun. 2017.*
English Translation for KR101300019 published Aug. 2013.*
Translation for CN109938276 published Jun. 2019.*
Borzekowski et al. Molecules. vol. 24. Jul. 2019. Formation of Zearalenone Metabolites in Tempeh Fermentation.*
English Translation for CN104543799 published Apr. 2015.*
Office Action issued on Apr. 6, 2023 for the corresponding Chinese patent application No. 202080006780.4 (9 pages).
Zhang Jianhao et al., "Development of tempeh flavorings", Food Science, No. 11, Nov. 30, 1994, pp. 45-47 including the English translation of the related part to this case (2 pages).
Lan Fei et al., "The Composition Changes in the Fermentation Process of Tempe and Its Functionality", Bulletin of Science and Technology, vol. 25, No. 1, Jan. 15, 2009, pp. 61-65 (with English abstract).
International Search Report for International Application No. PCT/KR2020/015008 mailed Mar. 4, 2021 (4 pages), including English Translation.
Extended European Search Report issued on Nov. 7, 2023 for the corresponding European patent application No. 20881416.0 (8 pages).
Notice of Allowance issued on Mar. 1, 2024 for the corresponding Chinese Patent Application No. 202080006780.4 (6 pages including English Translation).
Yona Septiani, Tjahjadi Purwoko, Artini Pangastuti, "Carbohydrate, lipid, and protein contents in soy sauce of tempe", Asian Journal of Tropical Biotechnology, vol. 1, No. 2, Dec. 31, 2004, pp. 48-53.

* cited by examiner

*Primary Examiner* — Anthony J Weier
(74) *Attorney, Agent, or Firm* — Merchant & Gould P.C.

(57) ABSTRACT

The present disclosure relates to a novel concept of sauce, and specifically to a novel sauce using tempeh and a preparation method thereof. A method for preparing a tempeh-containing sauce according to the present application includes secondary fermenting tempeh with brine and other grains to prepare a fermented aged product.

12 Claims, 3 Drawing Sheets

METHOD FOR PRODUCING TEMPE-CONTAINING SAUCE AND SAUCE PRODUCED THEREFROM

CROSS-REFERENCE TO RELATED APPLICATIONS

This application is a National Stage Application of PCT/KR2020/015008, filed 30 Oct. 2020, which claims the benefit of Korean Patent Application No. 10-2019-0136662, filed on 30 Oct. 2019, and Korean Patent Application No. 10-2020-0142341, filed on 29 Oct. 2020 in the Korean Intellectual Property Office, and which applications are incorporated herein by reference. To the extent appropriate, a claim of priority is made to each of the above disclosed applications.

TECHNICAL FIELD

The present disclosure relates to a novel concept of sauce, and specifically to a novel sauce using tempeh and a preparation method thereof.

BACKGROUND ART

Tempeh or tempe is a traditional Indonesian fermented bean products, and is generally made by steaming and peeling beans, followed by mainly inoculating and fermenting with a *Rhizopus* strain. Tempeh is made of beans like tofu, but has a different nutritional properties and texture. For example, tempeh looks like tofu, but tastes like mushroom. In the fermentation process for preparation, as the *Rhizopus* strain grows, this mycelium surrounds beans and sticks to the beans, forming firm texture, so that tempeh is also used as a meat substitute.

In Indonesia, tempeh is a common food ingredient which is sliced and then deep-fried or stir-fried to eat. In addition, tempeh is rich in amino acids and vitamins, and in particular, usually contains two-thirds of the calcium in a cup of milk.

This application was completed after intensive research to develop a new sauce with excellent flavor by subjecting tempeh which has excellent nutritional values as described above to a secondary fermentation without deep-frying or stir-frying, so that enhanced nutritional values may be obtained.

DISCLOSURE OF THE INVENTION

Technical Problem

The present application is intended to provide a method for preparing a novel tempeh-containing sauce and a sauce prepared thereby.

In one aspect, the present application is intended to provide a method for further enhancing nutritional values, for example, the content of amino acids of tempeh, and a new sauce having excellent flavor by a secondary fermentation of tempeh.

Technical Solution

To achieve the purposes described above, an aspect of the present application provides a method for preparing a aged composition of fermented tempeh mixture comprising an aging step of aging a mixture obtained by adding at least one or more of edible salt or brine to tempeh.

The tempeh used in the preparation of the aged composition of fermented tempeh mixture may be a commercially available tempeh, or may be directly prepared tempeh, but is not limited thereto.

In one specific embodiment, the tempeh for preparing the aged composition of fermented tempeh mixture may be prepared by inoculating and incubating *Rhizopus* strain into steamed beans. As an example, the *Rhizopus* strain may be inoculated in an amount of 0.1 to 5 wt %, for example, 0.1 to 2 wt %, based on the total weight of the steamed beans. The incubation may be performed at, for example, 10° C. to 50° C., such as 15° C. to 45° C., 20° C. to 40° C., or 25° C. to 35° C. In addition, the incubation may include fermenting 1 day to 15 days, 1 to 10 days, or 1 to 4 days.

In one specific embodiment, the incubation for preparing the tempeh may include fermenting at 10° C. to 50° C. for 1 day to 15 days.

In another specific embodiment, the incubation for preparing the tempeh may include fermenting at 25° C. to 35° C. for 1 day to 4 days.

The method for preparing a aged composition of fermented tempeh mixture prepares a aged composition of fermented tempeh mixture by adding at least one or more of edible salt or brine to tempeh to prepare a mixture and aging the mixture.

A method for preparing a aged composition of fermented tempeh mixture according to one specific embodiment may be aging a mixture in which at least one or more of edible salt and brine, and at least one or more of steamed rice, steamed soybean, steamed brown rice, or steamed black rice are further added to tempeh.

In one specific embodiment, a content of tempeh may be 10 to 80 wt % based on the total weight of the mixture, but is not limited thereto.

In one specific embodiment, a water content of the mixture in which at least one or more of the edible salt, brine, steamed rice, steamed soybean, steamed brown rice, or steamed black rice is added may be 45 to 70 wt %, 50 to 70 wt %, 55 to 70 wt %, or 56 to 69 wt %. In addition, in the aging step, at least one or more of the edible salt or brine may be added so that a salt concentration is 5 to 15 wt %, for example, 5 to 10 wt %, 5 to 7 wt %, or 7 to 9 wt %, based on the total weight of mixture to which they are added. When the water content and/or salt concentration in the mixture are within the above range, a nutrient component, specifically a content of amino acids of the aged composition of fermented tempeh mixture prepared may be excellently improved, and storage stability of food may be excellently improved by inhibiting the growth of microorganisms in the aged composition of fermented tempeh mixture prepared, but the present application is not limited thereto.

The aging is to ferment tempeh to which at least one or more of edible salt, brine, steamed rice, steamed soybean, steamed brown rice, or steamed black rice is added depending on a desired fermentation flavor to prepare a aged composition of fermented tempeh mixture. The aging may be performed at, for example, 10° C. to 50° C., such as 15° C. to 45° C., 20° C. to 40° C., 25° C. to 45° C., 25° C. to 35° C., 35° C. to 45° C., or 25° C. to 35° C. The aging may be performed at, for example, 20° C., 30° C., or 40° C. In addition, the aging may include fermenting 1 day to 30 days, for example, 1 day to 25 days, 1 day to 20 days, 1 day to 15 days, 1 day to 14 days, 3 days to 14 days, or 3 days to 15 days. When the aging temperature and/or aging days are within the above range, a nutrient component, specifically a content of amino acids of the aged composition of fermented tempeh mixture prepared may be excellently improved, and storage stability of food may be excellently improved by inhibiting the growth of microorganisms in the aged composition of fermented tempeh mixture prepared, but the present application is not limited thereto.

Another aspect of the present application provides a aged composition of fermented tempeh mixture prepared by the above preparation method.

A aged composition of fermented tempeh mixture prepared according to the present application is prepared by including a secondary fermentation by adding at least one or more of edible salt or brine to tempeh, for example, by adding at least one or more of edible salt or brine, and at least one or more of steamed rice, steamed soybean, steamed brown rice, or steamed black rice to tempeh, and thus has effect that exhibits a much higher content of amino acids, vitamins, etc., as well as unique flavor of tempeh compared to tempeh itself.

The effect of the aged composition of fermented tempeh mixture is not limited thereto, but for example, it is to further increase the content of useful components, such as amino acids, free saccharide, organic acids of bean, thereby further increasing nutritional values by a secondary fermentation of tempeh, which is prepared by a primary fermentation by a *Rhizopus* strain, such as a *Rhizopus oliogosporus* strain.

The present application prepares a tempeh-containing sauce including the aged composition of fermented tempeh mixture, and thereby, further expending the field of application of tempeh by using tempeh as a raw material for preparing a novel sauce, beyond the conventional use of tempeh as a food ingredient, so that exhibits the effect of increasing the utility of tempeh.

Another aspect of the present application provides a tempeh-containing sauce including a aged composition of fermented tempeh mixture as prepared above.

A tempeh-containing sauce according to the present application includes the aged composition of fermented tempeh mixture. One specific embodiment may include a secondary culture aged following adjusting a salinity of the primary fermented bean by *Rhizopus oliogosporus*.

The tempeh-containing sauce may include the aged composition of fermented tempeh mixture content of 1 to 99 wt %, for example, 1 to 90 wt %, 1 to 80 wt %, 1 to 70 wt %, 1 to 60 wt %, 1 to 50 wt %, 1 to 40 wt %, 1 to 35 wt %, 1 to 30 wt %, 1 to 10 wt %, or 3 to 27 wt %.

The tempeh-containing sauce may be the aged composition of fermented tempeh mixture simply diluted in water, or may further include one or more additives selected from the group consisting of spice plants, processed spices, fermented pastes, saccharides, flavor enhancers, edible salt, vinegar, nuts, complex seasoning foods, and fermented bean products in the aged composition of fermented tempeh mixture by mixing one or more additives selected from the group consisting of spice plants, processed spices, fermented pastes, saccharides, flavor enhancers, salt, vinegar, nuts, complex seasoning foods, and fermented bean products with the aged composition of fermented tempeh mixture to enhance the flavor of the tempeh-containing sauce.

The 'spice plants' are plants added to add taste and flavor to the sauce, and may include but not limited to, for example, red pepper, garlic, ginger, black pepper, onion, green onion, shallot, and so on.

The 'processed spices' refers to a simply processed leaf, stem, fruit, root, etc. of spice plants, or a processed by mixing with food additives used to enhance flavor of other food. The processed spices may include but not limited to, for example, natural spices such as red pepper powder, black pepper powder, cinnamon powder, oregano whole, rosemary, and spice preparations such as mustard, curry, tomato ketchup.

The 'complex seasoning food' is a food mixed with saccharides, edible salt, spices, protein hydrolysate, yeast, or extract thereof, and food additive, and processed into powder, granule, or solid state. For example, red pepper seasoning may be used, and the red pepper seasoning is a paste made by mixing red pepper powder, onion, garlic, water, salt and so on.

The 'fermented bean product' is a product obtained by fermentation by mixing soybean or soybean meal with sugar, and is a food with liquid properties having sugar content of 30% or more.

The 'fermented pastes' is a food obtained by culturing koji mold, etc. in animal-vegetable raw material or using meju as the main raw material, mixing with edible salt, etc., fermenting-aging, and followed by preparing-processing, and may include, but is not limited to, for example, Korean-style meju, modernized meju, Korean-style soy sauce, brewed soy sauce, acid-hydrolyzed soy sauce, enzyme-hydrolyzed soy sauce, blended soy sauce, Korean-style soybean paste, soybean paste, red pepper paste, chunjang (sweet wheat paste), cheonggukjang (fermented soybean paste), blended paste, or the like.

The 'saccharides' refer to sugars, sugar syrups, oligosaccharides, glucose, fructose, maltose obtained by processing a starch material or sugar solution, or saccharide products processed therefrom.

The 'flavor enhancer' is to enhance taste or flavor of food, and may include, for example, sodium glutamate, or the like.

The 'nuts' are not particularly limited as long as edible nuts, and may include, for example, peanuts, almonds, walnuts, macadamia, hazelnuts, pine nuts, acorns, torreya nuts, brazil nuts, cashew nuts, coffee beans, cocoa beans, pistachios, pecans, sunflower seeds, or the like.

In one specific embodiment, the tempeh-containing sauce may further include at least one or more of red pepper powder, red pepper, salt, soy sauce, tomato ketchup, and other spice plants, processed spices, saccharides, flavor enhancer, complex seasoning foods, or nuts.

The tempeh-containing sauce may not include other additives other than the above-described components, or may further include other additives. When the other additives are further included, such other additives may include a preservative and/or an excipient acceptable for a food.

The preservative acceptable for a food may include, but not limited to, for example, sorbic acids, benzoic acids, dehydroacetic acids, paraoxy-benzoic acids, propionic acids, or the like. The preservative may be in the form of a salt, such as potassium sorbate, calcium sorbate, sodium benzoate, sodium propionate, calcium propionate, sodium paraoxy-benzoate, or the like.

The excipient acceptable for a food is not limited thereto, and for example, at least one selected from the group consisting of crosslinked carboxymethylcellulose sodium, gum ghatti, persimmon color, licorice extract, formic acid, geranyl formate, citronellyl formate, isoamyl formate, gum resin, geraniol, crystalline cellulose, cinnamic acid, methyl cinnamate, ethyl cinnamate, cinnamaldehyde, cinnamyl alcohol, kaoliang color, benzoyl peroxide, hydrogen peroxide, peracetic acid, ammonium persulfate, guar gum, disodium 5'-guanylate, citric acid, manganese citrate, trisodium citrate, sodium ferrous citrate, ferric citrate, ammonium ferric citrate, potassium citrate, calcium citrate, magnesium silicate, calcium silicate, silicon resin, diatomaceous earth, gluconic acid, sodium gluconate, copper gluconate, magnesium gluconate, manganese gluconate, zinc gluconate, iron gluconate, potassium gluconate, calcium gluconate, glutaminase, butyrate, butyl butyrate, ethyl butyrate, isoamyl butyrate, neotam, nisi, nicotinic acid, nickel, nicotinic acid amide, dextranase, dextran, sodium lauryl sulfate, lactase, lactoferrin concentrate, lactitol, lecithin, rosin, locust bean gum, rutin, linalool, mannitol, maltol, D-maltitol, sodium metasilicate, sodium metaphosphate, potassium metaphosphate, sodium metabisulfite, potassium metabisulfite, sodium methoxide, sulfurous acid anhydride, myristic acid, microfibrillated cellulose, vanillin, kaolin, betaine, bentonite, powdered cellulose, sodium fluoride, biotin, vitamins, glacial acetic acid, DL-malic acid, sodium saccharin, saffron color, acid clay, sodium bisulfite, acidic sodium aluminum phosphate, disodium dihydrogen pyrophosphate, acidic sodium pyrophosphate, magnesium oxide, zinc oxide, calcium oxide, methyl salicylate, iron sesquioxide, fiber wax, sodium hydroxide, potassium hydroxide, calcium hydroxide, magnesium hydroxide, sucralose, shellac, steviol glycosides, stearic acid, stearate, food coloring, benzoic acid, benzoate, alginic acid and algylate, inositol, silicon dioxide, chlorine dioxide, carbon dioxide, titanium dioxide, xanthan gum, starch, modified starch, lactic acid and lactate, gelatin, gellan gum, mold starter, carnauba wax, carrageenan, gum karaya, carotene, sodium carboxymethylcellulose, calcium carboxymethylcellulose, sodium carboxymethyl starch, casein and caseinate, chitosan, chitin, tara gum, tamarind gum, taurine, tannic acid, palmitic acid, ethyl phenylacetate, isobutyl phenylacetate, pectin, pepsin, hydroxypropylmethylcellulose, hydroxypropylcellulose, hyaluronic acid, and yeast extract.

Another aspect of the present application provides a method for preparing a tempeh-containing sauce including mixing one or more additives selected from the group consisting of spice plants, processed spices, paste, saccharides, flavor enhancers, salt, vinegar, nuts, complex seasoning foods and fermented bean products with the aged composition of fermented tempeh mixture prepared as above.

The aged composition of fermented tempeh mixture, spice plants, processed spices, pastes, saccharides, flavor enhancer, edible salt, vinegar, nuts, complex seasoning food, and fermented bean products are as described above.

According to one specific embodiment, the present application may include one or more additives selected from the group consisting of aged composition of fermented tempeh mixture and spice plants, processed spices, paste, saccharides, flavor enhancers, salt, vinegar, nuts, complex seasoning foods and fermented bean products, and prepare a tempeh-containing sauce having an amino-type nitrogen content of 5 mg % or more.

The method for preparing a tempeh-containing sauce may further include sterilizing after mixing the one or more additives with the aged composition of fermented tempeh mixture.

In one specific embodiment, the sterilization may be performed at a temperature of 60° C. or more, for example, 60° C. to 120° C., 65° C. to 110° C., or 70° C. to 110° C.

In one specific embodiment, the sterilization may be performed for 10 minutes or more, for example, 10 minutes to 5 hours, 10 minutes to 3 hours, or 10 minutes to 1 hour.

In one specific embodiment, the sterilization may be performed using known means such as wet sterilization, dry sterilization, high-pressure sterilization, ultrahigh-pressure sterilization, and the like.

The amino-type nitrogen content may be 5 mg % or more and 1000 mg % or less, more specifically, 40 mg % or more, 80 mg % or more, 100 mg % or more, 150 mg % or more, 200 mg % or more, 400 mg % or more, and/or 1000 mg % or less, 700 mg % or less.

A method for preparing a tempeh-containing sauce according to the present application may exhibit effect of providing a new sauce with enhanced flavor and rich in nutrients such as amino acids, free sugars, organic acids compared to a prepared tempeh as well as beans which are raw materials used for preparation.

Advantageous Effects

A method for preparing a aged composition of fermented tempeh mixture and/or a method for preparing a tempeh sauce according to the present application may provide a novel concept of sauce with excellent flavor.

In addition, a method for preparing a aged composition of fermented tempeh mixture and/or a method for preparing a tempeh sauce according to the present application may provide a tempeh-containing sauce having further increased nutritional values of tempeh, for example, excellent amino acid content.

Further, a method for preparing a aged composition of fermented tempeh mixture according to the present application may provide a tempeh-containing sauce with improved storage stability by improving microbial stability.

MODE FOR CARRYING OUT THE INVENTION

Hereinafter, the present disclosure will be described in more detail to allow for a clearer understanding of the present disclosure.

Preparatory Example 1. Preparation of Aged
Composition of Fermented Tempeh Mixture

[Preparation of Tempeh]

Tempeh was prepared by inoculating 0.1 to 2 wt % of *R. oligosporus* into steamed soybean and then fermenting at 20° C. to 40° C. for 1 day to 15 days.

Preparation of Aged Composition of Fermented Tempeh Mixture

Example 1

A fermented tempeh mixture was prepared by adding the tempeh prepared above to 10 wt % to 40 wt % in 5 wt % to 15 wt % concentration of brine. At this time, the water content in the fermented tempeh mixture was adjusted to be 45 wt % to 70 wt %. Then, according to a desired fermentation flavor, the mixture was aged at 10° C. to 40° C. for 3 days to 30 days to prepare a aged composition of fermented tempeh mixture.

Example 2

A fermented tempeh mixture was prepared by adding the tempeh prepared above to 40 wt % to 80 wt % in 5 wt % to 15 wt % concentration of brine. At this time, the water content in the fermented tempeh mixture was adjusted to be 45 wt % to 70 wt %. Then, according to a desired fermentation flavor, the mixture was aged at 10° C. to 40° C. for 3 days to 30 days to prepare a aged composition of fermented tempeh mixture.

Example 3

A fermented tempeh mixture was prepared by adding the tempeh prepared above to 10 wt % to 80 wt % in 5 wt % to 15 wt % concentration of brine. At this time, the water content in the fermented tempeh mixture was adjusted to be 45 wt % to 70 wt %. Then, according to a desired sauce flavor, at least one or more of steamed rice, steamed soybean, steamed brown rice, or steamed black rice were added to the prepared fermented tempeh mixture and according to a desired fermentation flavor, the mixture was aged at 10° C. to 40° C. for 3 days to 30 days to prepare a aged composition of fermented tempeh mixture. At this time, the total content of the added steamed grain was adjusted to 5 wt % to 50 wt % based on the aged composition of fermented tempeh mixture prepared.

Figure 1:
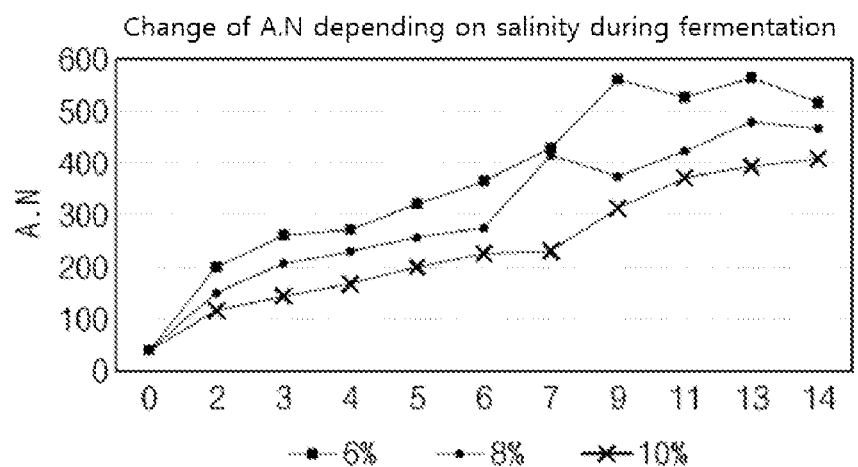
FIG. 1 is a graph showing analysis results of the amino acid content of aged composition of fermented tempeh mixture prepared depending on a salt concentration in a fermented tempeh mixture for preparing aged composition of fermented tempeh mixture according to an embodiment of the present application.

Experimental Example 1. Analysis of the Amino Acid Content of Aged Composition of Fermented Tempeh Mixture According to Salinity in the Fermented Tempeh Mixture To evaluate an amino acid content of aged composition of fermented tempeh mixture prepared according to salinity of a fermented tempeh mixture in the preparation of aged composition of fermented tempeh mixture of example 2, the amino type nitrogen contents were measured according to the salinity, and the results are shown in FIG. 1.

[Method for Measuring Amino Type Nitrogen Content]

AN: amino type nitrogen

1. Preparation of a reagent
1) 1% phenolpthalein: 5 g of 1% phenolpthalein was dissolved in ethylalcohol to 500 ml.
2) 50% formalin: formalin and DW were mixed and prepared in a content ratio of 1:1.

2. Experimental method
1) About 5 g of reagent was taken and filled a 250 ml mess flask with distilled water to the mark.
2) After filtration, 50 ml of filtrate was taken.
3) As an indicator, 2 to 3 drops of phenolpthalein were added and titrated with 0.1 N NaOH until the pale red color appeared.
4) 30 ml of formalin was put into a conical beaker, and 2 to 3 drops of phenolpthalein were added as an indicator, followed by titrating with 0.10.1 N NaOH until the pale red color appeared.
5) the 3) and 4) above were mixed and titrated with 0.1 N NaOH until the pale red color appeared.
(6) At this time, there is no need to add phenolpthalein solution.)

At this time, titrated mL was applied to the equation below to calculate amino type nitrogen content.

$$A \cdot N = (\text{number of } 0.1N \text{ NaOH(ml)} \times 700)/\text{amount of sample}$$

Figure 2:
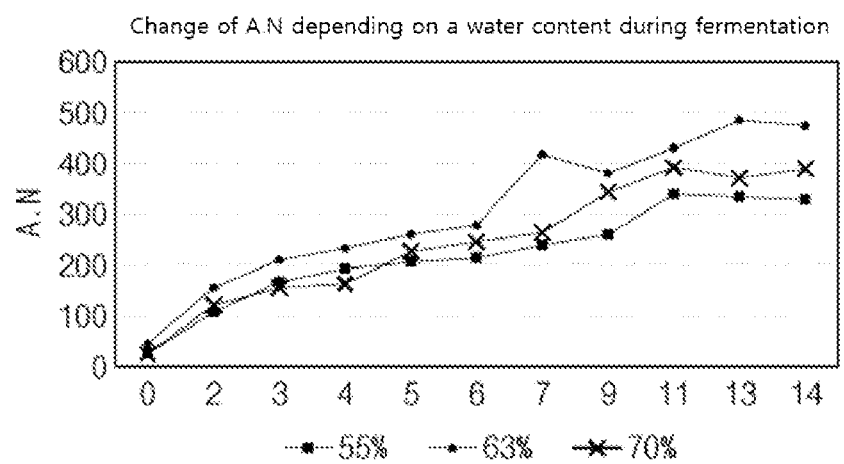
FIG. 2 is a graph showing analysis results of the amino acid content of aged composition of fermented tempeh mixture prepared depending on a water content in a fermented tempeh mixture for preparing aged composition of fermented tempeh mixture according to an embodiment of the present application.

Experimental Example 2. Analysis of the Amino Acid Content of Aged Composition of Fermented Tempeh Mixture According to a Water Content in the Fermented Tempeh Mixture To evaluate the amino acid content of aged composition of fermented tempeh mixture prepared according to a water content of the fermented tempeh mixture in the preparation of aged composition of fermented tempeh mixture of example 2, the amino type nitrogen contents were measured according to the water content, and the results are shown in FIG. 2.

Figure 3:
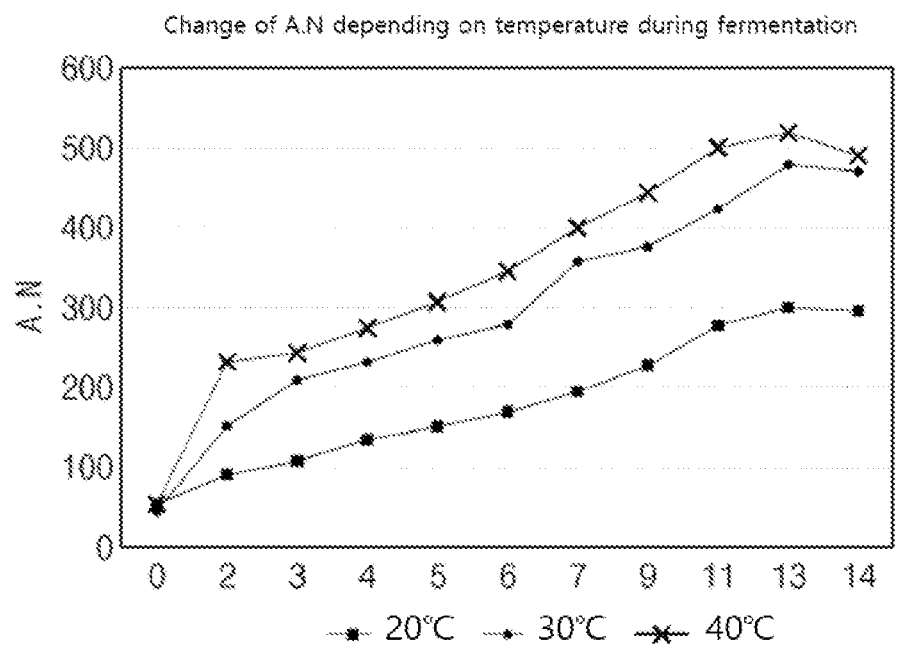
FIG. 3 is a graph showing analysis results of the amino acid content of aged composition of fermented tempeh mixture prepared depending on an aging temperature of a fermented tempeh mixture according to an embodiment of the present application.

Experimental Example 3. Analysis of the Amino Acid Content of Aged Composition of Fermented Tempeh Mixture According to the Aging Temperature To evaluate the amino acid content of aged composition of fermented tempeh mixture prepared according to the aging temperature of the fermented tempeh mixture in the preparation of aged composition of fermented tempeh mixture of example 2, the amino type nitrogen content was measured according to the aging temperature, and the results are shown in FIG. 3.

Figure 4:
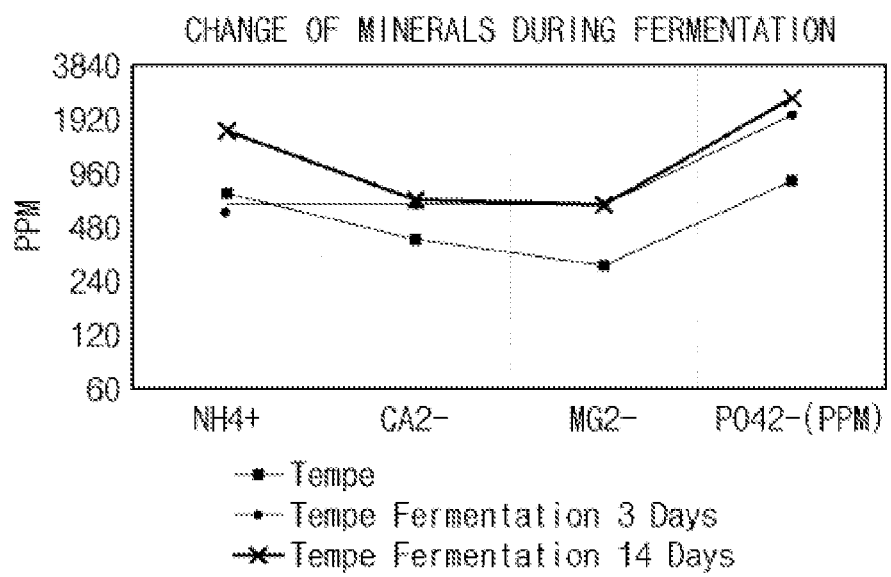
FIG. 4 is a graph showing analysis results of nutrient components (minerals) content of aged composition of fermented tempeh mixture prepared and tempeh before aging, depending on a fermentation day of a fermented tempeh mixture according to an embodiment of the present application.
Figure 5:
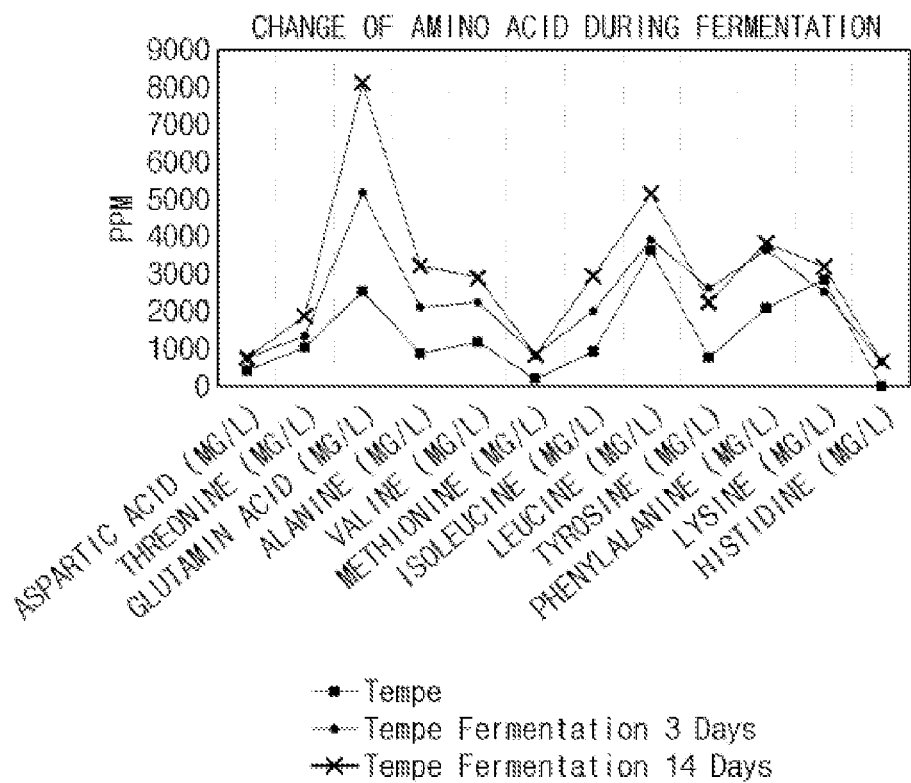
FIG. 5 is a graph showing analysis results of nutrient components (amino acids) content of aged composition of fermented tempeh mixture prepared and tempeh before aging, depending on a fermentation day of a fermented tempeh mixture according to an embodiment of the present application.

Experimental Example 4. Analysis of Nutrient Components of Aged Composition of Fermented Tempeh Mixture According to the Aging Date In the preparation of aged composition of fermented tempeh mixture of example 2, changes of nutrient components according to the aging date were evaluated and the results are shown in FIG. 4 and FIG. 5. FIG. 4 shows the analysis results of mineral components of $NH_4^+$, $Ca_2^+$, $Mg^{2-}$, $PO_4^{2-}$ and FIG. 5 shows the analysis results of amino type nitrogen content.

It was confirmed that the content of minerals and amino type nitrogen of aged composition of fermented tempeh mixture are superior compared to tempeh, and in particular, it was confirmed that the content of minerals and amino type nitrogen of aged composition of fermented tempeh mixture increased from aging 3 days, and that nutrient components similar to that of tempeh were detected after 14 days.

Experimental Example 5. Analysis of Microbial Stability According to Aging Conditions of Aged Composition of Fermented Tempeh Mixture In the preparation of aged composition of fermented tempeh mixture of example 2, changes in number of microorganisms according to aging conditions of salinity, water content and aging temperature were evaluated, and the results are shows in table 1 below.

TABLE 1

| Microorganism for analysis | Aging conditions | Aging 1 Day | Aging 14 Days | Note |
|---|---|---|---|---|
| Bacillus cereus, B.C. | salinity 7 to 9 wt %, water content 56 to 69%, aging temperature 25 to 35° C. | ND | ND | |
| | salinity 6 wt % | 2.00.E+04 | 1.00.E+03 | Fixed water and temperature conditions |
| | salinity 10 wt % | ND | 1.00.E+05 | |
| | water 55 wt % | 1.00.E+04 | 1.20.E+05 | Fixed salinity and temperature conditions |
| | water 70 wt % | ND | ND | |
| | Aging temperature 20° C. | ND | ND | Fixed salinity and water conditions |
| | Aging temperature 40° C. | ND | 1.00.E+03 | |

A series of experiments as described above confirmed that when a fermented tempeh mixture having 7 to 9 wt % of salinity and 56 to 69 wt % of water content was fermented at the temperature of 25 to 35° C. for 3 days to 14 days, aged composition of fermented tempeh mixture exhibited excellent nutrient components and storage stability, and a tempeh-containing sauce prepared by using the aged composition of fermented tempeh mixture exhibited excellent sterilizing effect, but the present application is not limited thereto.

Preparatory Example 2. Preparation of a Tempeh-Containing Sauce

Depending on the taste direction of a desired sauce, 3 wt % to 50 wt % of the aged composition of fermented tempeh mixture of example 2 was added, and red pepper powder, red pepper, salt, soy sauce, tomato ketchup, and other complex seasoning foods (for example, red pepper seasoning), saccharides (sugar, high fructose, sugar syrup, oligosaccharide, starch syrup), flavor enhancers, etc. were mixed, sterilized at 70° C. to 110° C. for 10 minutes to 1 hour, cooled, and then packaged to prepare four types of tempeh-containing sauces having different contents of aged composition of fermented tempeh mixture.

Experimental Example 6. Analysis of Amino Acid Content of Tempeh-Containing Sauces The amino type nitrogen contents were measured to evaluate amino acid content for each of the four tempeh-containing sauces prepared above, and the results are shown in table 2 below.

To compare utility of the tempeh-containing sauces according to the present application, evaluation results for amino type nitrogen content in the sauces of comparative example 1 (chili sauce, ABC sambal) and comparative example 2 (black bean fermented sauce, kecap manis), which are commercially available are shown in table 3 below.

TABLE 2

| | Example | AN (mg %) |
|---|---|---|
| tempeh-containing sauce | 2-1 | 295.93 |
| | 2-2 | 413.55 |
| | 2-3 | 422.58 |
| | 2-4 | 423.51 |

TABLE 3

| | AN (mg %) |
|---|---|
| comparative example 1) ABC sambal | 33.32 |
| comparative example 2) kecap manis | 21.56 |

The results of table 2 and table 3 confirmed that the tempeh-containing sauce according to the present application contains an amino type nitrogen content of 10 to 20 times or more compared to the existing commercial sauces. Accordingly, it was confirmed that high nutritional values and rich body taste obtained according to the present application.

The invention claimed is:

1. A method for preparing aged composition of fermented tempeh mixture comprising an aging step for aging a mixture obtained by adding at least one or more of edible salt or brine to tempeh,
   wherein in the aging step, the aging comprises fermenting at 25° C. to 35° C.

2. The method of claim 1, wherein the tempeh is obtained by inoculating and culturing a *Rhizopus* strain into steamed beans.

3. The method of claim 2, wherein the *Rhizopus* strain is inoculated in a content of 0.1 to 5 wt % based on the total weight of steamed beans.

4. The method of claim 2, wherein the incubation for preparing the tempeh comprises fermenting at 10° C. to 50° C. for 1 day to 15 days.

5. The method of claim 1, wherein in the aging step, a water content of the mixture is 45 to 70 wt %.

6. The method of claim 1, wherein
   in the aging step, the at least one or more of edible salt or brine is added so that a salt concentration is 5 to 15 wt % based on the total weight of the mixture to which they are added.

7. The method of claim 1, wherein in the aging step, the aging comprises fermenting for 1 day to 30 days.

8. A tempeh-containing sauce comprising aged composition of fermented tempeh mixture prepared according to claim 1.

9. The tempeh-containing sauce of claim 8, wherein the tempeh-containing sauce comprises one or more selected from the group consisting of spice plants, processed spices, paste, saccharides, flavor enhancers, edible salt, vinegar, nuts, complex seasoning foods and fermented bean products.

10. The tempeh-containing sauce of claim 8, wherein the aged composition of fermented tempeh mixture is contained in a content of 1 to 99 wt % based on the total weight of the tempeh-containing sauce.

11. A method for preparing a tempeh-containing sauce comprising a step of mixing one or more additives selected from the group consisting of spice plants, processed spices, paste, saccharides, flavor enhancers, salt, vinegar, nuts, complex seasoning foods and fermented bean products with aged composition of fermented tempeh mixture prepared according to claim 1.

12. The tempeh-containing sauce according to claim 8, wherein an amino-type nitrogen is present in an amount of 5 mg % or more.

* * * * *